United States Patent [19]
Kelly

[11] Patent Number: 5,625,335
[45] Date of Patent: Apr. 29, 1997

[54] FIFTH WHEEL HITCH WARNING INTERLOCK DEVICE

[76] Inventor: Stuart F. Kelly, 1725 Marley Ave., Glen Burnie, Md. 21060

[21] Appl. No.: 456,326

[22] Filed: Jun. 1, 1995

[51] Int. Cl.⁶ ............................................. G08B 21/00
[52] U.S. Cl. ........................... 340/431; 280/432; 410/64
[58] Field of Search ................................. 340/431, 686, 340/687; 280/432, 433; 410/64, 58; 361/170; 200/61.41

[56] References Cited

U.S. PATENT DOCUMENTS

| | | | |
|---|---|---|---|
| 2,387,625 | 10/1945 | Walther et al. | 340/431 |
| 3,444,825 | 5/1969 | Rollins | 410/64 |
| 3,535,679 | 10/1970 | Connors | 340/431 |
| 3,697,974 | 10/1972 | Harris et al. | 340/431 |
| 4,472,100 | 9/1984 | Wagner | 280/441.2 X |
| 5,477,207 | 12/1995 | Frame, Sr. et al. | 340/431 |
| 5,516,138 | 5/1996 | Fontaine | 280/434 |

*Primary Examiner*—Thomas Mullen

[57] ABSTRACT

A device for monitoring operation of a lock lever of a fifth wheel trailer hitch. The inventive device includes a switch mounted to a fifth wheel hitch and responsive to a position of either the lock lever or an air cylinder actuator rod coupled to the lock lever. The switch is electrically coupled to an interlock solenoid and an indicator light for respectively blocking movement of the trailer raise/lower lever and indicating incomplete coupling of a trailer to the fifth wheel hitch.

11 Claims, 3 Drawing Sheets

FIFTH WHEEL HITCH WARNING INTERLOCK DEVICE

BACKGROUND OF THE INVENTION

1. Field of the Invention

The present invention relates to trailer hitch structures and more particularly pertains to a fifth wheel hitch warning interlock device for monitoring operation of a lock lever of a fifth wheel trailer hitch.

2. Description of the Prior Art

The use of trailer hitch structures is known in the prior art. More specifically, trailer hitch structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art trailer hitch structures include U.S. Pat. No. 3,536,282; U.S. Pat. No. 3,647,248; U.S. Pat. No. 4,230,430; U.S. Pat. No. 5,348,101; U.S. Pat. No. 3,513,804; and U.S. Pat. No. 4,653,770.

While these devices fulfill their respective, particular objectives and requirements, the aforementioned patents do not disclose a fifth wheel hitch warning interlock device for monitoring operation of lock lever of a fifth wheel which includes a switch mounted to the fifth wheel hitch and responsive to the position of either the lock lever or an air cylinder actuator rod coupled to the lock lever, with the switch being electrically coupled to an interlock solenoid and an indicator light for respectively blocking movement of the trailer raise/lower lever and indicating incomplete coupling of a trailer to the fifth wheel hitch.

In these respects, the fifth wheel hitch warning interlock device according to the present invention substantially departs from the conventional concepts and designs of the prior art, and in so doing provides an apparatus primarily developed for the purpose of monitoring operation of a lock lever of a fifth wheel trailer hitch.

SUMMARY OF THE INVENTION

In view of the foregoing disadvantages inherent in the known types of trailer hitch structures now present in the prior art, the present invention provides a new fifth wheel hitch warning interlock device construction wherein the same can be utilized for ensuring complete coupling of a fifth wheel trailer hitch to a trailer. As such, the general purpose of the present invention, which will be described subsequently in greater detail, is to provide a new fifth wheel hitch warning interlock device apparatus and method which has many of the advantages of the trailer hitch structures mentioned heretofore and many novel features that result in a fifth wheel hitch warning interlock device which is not anticipated, rendered obvious, suggested, or even implied by any of the prior art trailer hitch structures, either alone or in any combination thereof.

To attain this, the present invention generally comprises a device for monitoring operation of a lock lever of a fifth wheel trailer hitch. The inventive device includes a switch mounted to a fifth wheel hitch and responsive to a position of either the lock lever or an air cylinder actuator rod coupled to the lock lever. The switch is electrically coupled to an interlock solenoid and an indicator light for respectively blocking movement of the trailer raise/lower lever and indicating incomplete coupling of a trailer to the fifth wheel hitch.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fifth wheel hitch warning interlock device apparatus and method which has many of the advantages of the trailer hitch structures mentioned heretofore and many novel features that result in a fifth wheel hitch warning interlock device which is not anticipated, rendered obvious, suggested, or even implied by any of the prior art tool guides, either alone or in any combination thereof.

It is another object of the present invention to provide a new fifth wheel hitch warning interlock device which may be easily and efficiently manufactured and marketed.

It is a further object of the present invention to provide a new fifth wheel hitch warning interlock device which is of a durable and reliable construction.

An even further object of the present invention is to provide a new fifth wheel hitch warning interlock device which is susceptible of a low cost of manufacture with regard to both materials and labor, and which accordingly is then susceptible of low prices of sale to the consuming public, thereby making such fifth wheel hitch warning interlock devices economically available to the buying public.

Still yet another object of the present invention is to provide a new fifth wheel hitch warning interlock device which provides in the apparatuses and methods of the prior art some of the advantages thereof, while simultaneously overcoming some of the disadvantages normally associated therewith.

Still another object of the present invention is to provide a new fifth wheel hitch warning interlock device for monitoring operation of a lock lever of fifth wheel trailer hitch.

Yet another object of the present invention is to provide a new fifth wheel hitch warning interlock device which includes a switch mounted to the fifth wheel hitch and responsive to the position of either the lock lever or an air cylinder actuator rod coupled to the lock lever, with the switch being electrically coupled to an interlock solenoid and an indicator light for respectively blocking movement of the trailer raise/lower lever and indicating incomplete coupling of a trailer to the fifth wheel hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
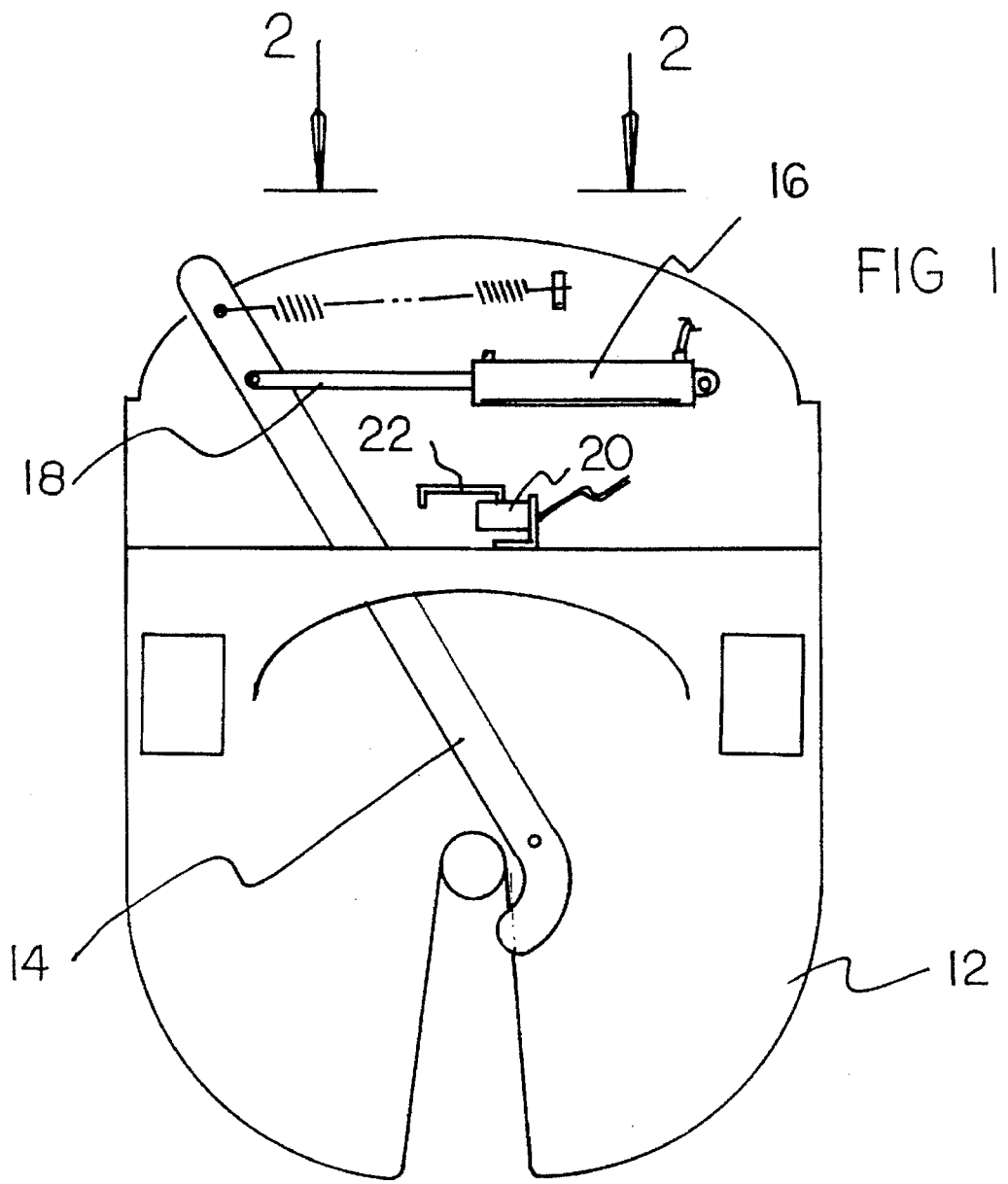
FIG. 1 is an top plan view of a portion of the fifth wheel hitch warning interlock device according to the present invention.

With reference now to the drawings, and in particular to FIGS. 1-5 thereof, a fifth wheel hitch warning interlock device embodying the principles and concepts of the present invention and generally designated by the reference numeral 10 will be described.

Figure 2:
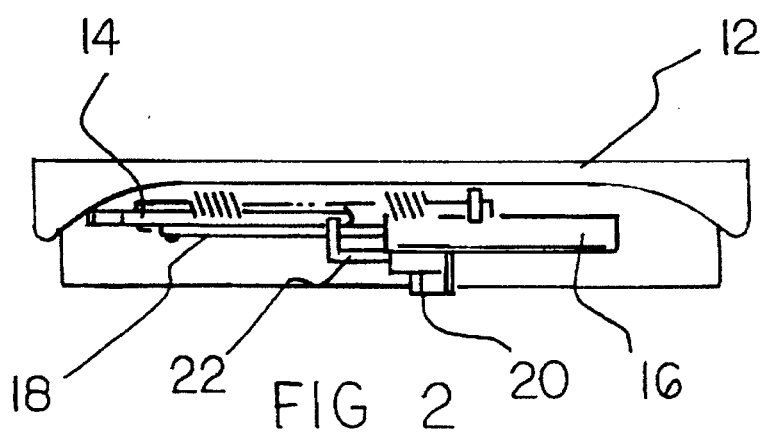
FIG. 2 is an end elevation view taken from line 2—2 of FIG. 1.

More specifically, it will be noted that the fifth wheel hitch warning interlock device 10 is configured for use with a fifth wheel hitch 12 having a lock lever 14 pivotally mounted thereto for coupling a trailer to an associated towing vehicle. The lock lever 14 operates by pivoting relative to the fifth wheel hitch 12 so as to secure an unlabeled hitch coupling of a trailer relative to the fifth wheel hitch 12 which is typically secured to the towing vehicle. To facilitate automatic pivoting of the lock lever 14, an air cylinder 16 can be mounted to the fifth wheel hitch 12 and include an actuator rod 18 coupled to the lock lever 14 so as to permit power assisted pivoting of the lock lever 14 through a controlled distribution of compressed air into and from the air cylinder 16. A switch 20 is mounted to the fifth wheel hitch 12 and includes a follower 22 projecting into a pivoting path of the lock lever 14, as shown in FIGS. 1 and 2 of the drawings. By this structure, a pivoting of the lock lever 14 into a closed position will cause the lock lever to engage the follower 22 to actuate the switch 20.

Figure 3:
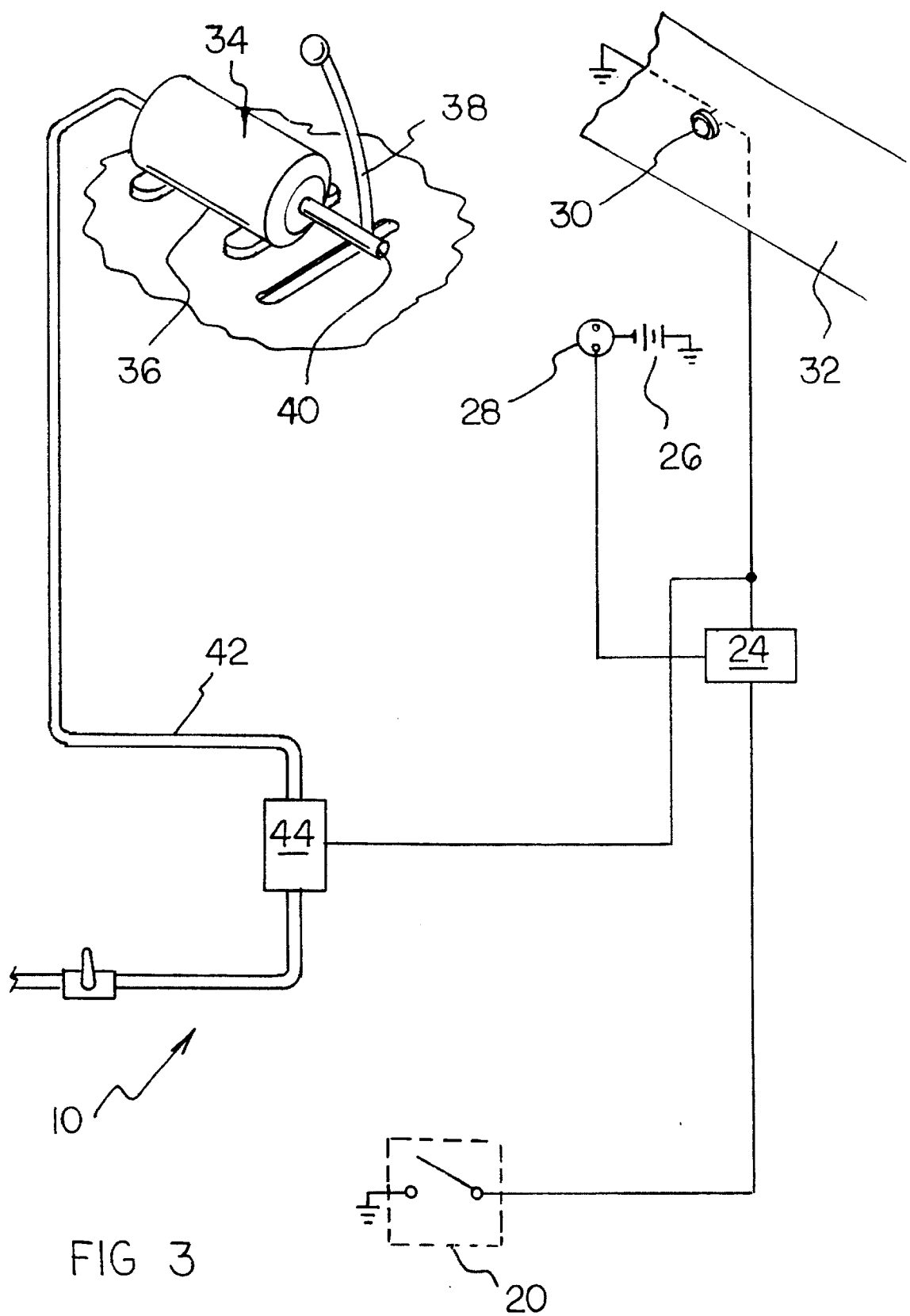
FIG. 3 is a schematic diagram of the present invention.

Referring now to FIG. 3 of the drawings it can be shown that the switch 20 is electrically coupled to a relay 24 through conventional electrical wiring extending therebetween. The relay 24 communicates with an electrical power source such as a battery 26 of the vehicle through an ignition switch 28. An indicator light 30 is electrically coupled to the relay 24 and can be mounted within an interior of the towing vehicle to a dashboard 32 thereof or in any other convenient location therewithin. By this structure, a complete pivoting of the lock lever 14 in a clock-wise direction from the position illustrated in FIG. 1 of the drawings will cause the lock lever 14 to engage the follower 22 so as to actuate the switch 20. Subsequently, the relay 24 will cause the indicator light 30 to either illuminate or extinguish so as to indicate to a driver of the towing vehicle that the lock lever 14 is in the proper closed and secure position to facilitate towing of an associated trailer.

With continuing reference to FIG. 3, it can be shown that the present invention 10 may further comprise an interlock means 34 positioned in electrical communication with the relay 24 for precluding operation of a trailer raise/lower lever when the lock lever 14 is in the position illustrated in FIG. 1 and spaced from the follower 22 of the switch 20. To this end, the interlock means 34 preferably comprises an interlock solenoid 36 which can be mounted within an interior of the towing vehicle proximal to a trailer raise/lower lever 38 of the towing vehicle. The interlock solenoid 36 includes a blocking projection 40 which can be extended or retracted relative thereto so as to selectively block movement of the trailer raise/lower lever 38 to preclude operation of the raise/lower lever and subsequent raising of the fifth wheel of an associated trailer. The interlock solenoid 36 may comprise an electric solenoid positioned in electrical communication with the relay 24 so as to cause operation of the blocking projection 40 into or away from the trailer raise/lower lever 38 in accordance with a position of the lock lever 14 of the fifth wheel hitch 12. However, the interlock solenoid 36 preferably comprises a pneumatic solenoid positioned in fluid communication with a pneumatic conduit 42 supplying compressed or pressurized air to the pneumatic solenoid. A pneumatic valve 44 is positioned in the pneumatic conduit 42 for selectively permitting or precluding fluid communication therethrough so as to control an operation of the interlock solenoid 36. The pneumatic valve 44 is electrically controlled and is coupled to the relay 24 such that the blocking projection 40 is controlled by the invention 10 in accordance with a position of the lever 14. By this structure, a positioning of the lock lever 14 in the open configuration illustrated in FIG. 1 of the drawings will result in a communication to a driver of the towing vehicle through the indicator light 30 and further cause the blocking projection 40 to extend into a path of movement of the trailer raise/lower lever 38 so as to preclude raising of the fifth wheel of the associated trailer. However, when the lock lever 14 is pivoted in a clock-wise direction as viewed from the FIG. 1 into a closed position and against the follower 22 of the switch 20, the relay 24 will cause the indicator light 30 to communicate to a driver of the towing vehicle that the lock lever 14 is closed, and further cause movement of the blocking projection 40 out of a path of movement of the trailer raise/lower lever 38 so as to permit the driver to raise the fifth wheel of the trailer coupled to the fifth wheel hitch 12. Thus, the present invention 10 operates to substantially ensure that the lock lever 14 is correctly positioned to securely engage the trailer to the fifth wheel hitch 12.

Figure 4:
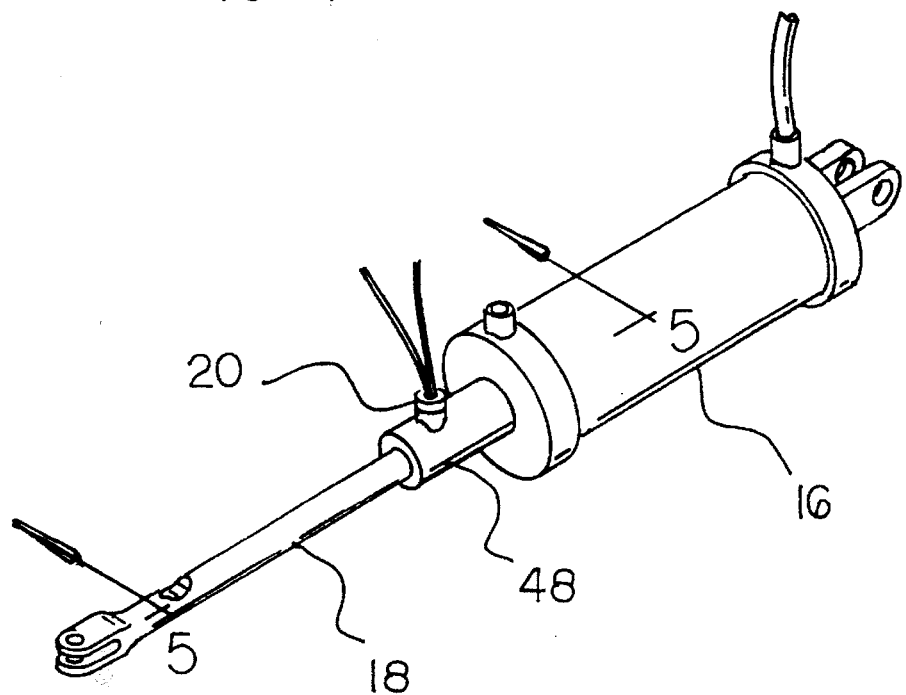
FIG. 4 is an isometric illustration of the invention incorporated into an air cylinder.
Figure 5:
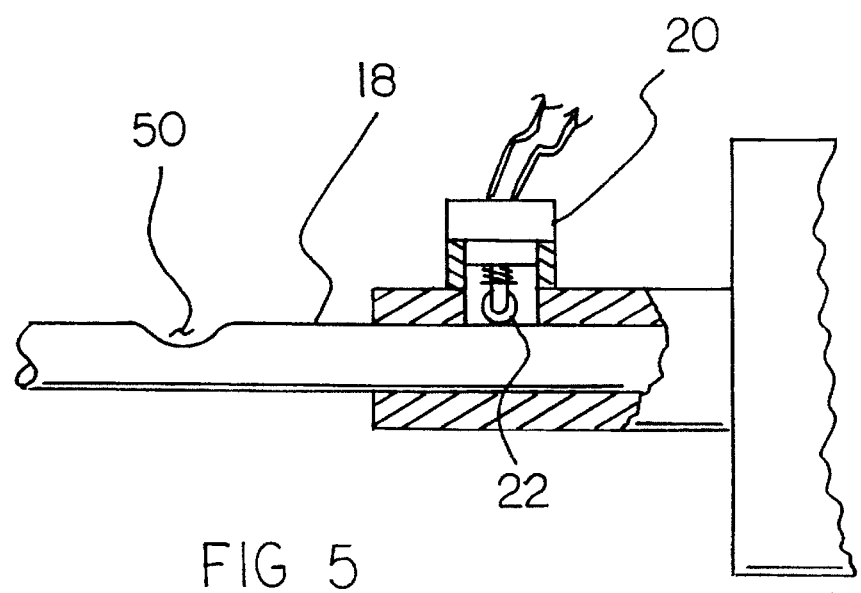
FIG. 5 is a cross sectional view taken along line 5—5 of FIG. 4.

Referring now to FIGS. 4 and 5, it can be shown that the switch 20 may alternatively be mounted relative to the air cylinder 16. To this end, a mounting sleeve 48 is secured to the air cylinder 16 and concentrically positioned about the actuator rod 18. The actuator rod 18 is desirably shaped so as to include a depression 50 directed thereinto which enters the mounting sleeve 48 when the lock lever 14 is positioned in a closed orientation. The follower 22 of the switch 20 engages an exterior surface of the actuator rod 18 and operates to enter the depression 50 when the lock lever 14 is positioned in the closed orientation. Thus, the depression 50 operates to actuate the switch 20 as the follower 22 is biased thereinto so as to result in the operation of the indicator light 30 and the interlock means 34 as described above.

In use, the fifth wheel hitch warning interlock device 10 according to the present invention can be easily utilized for monitoring operation of a lock lever 14 of a fifth wheel trailer hitch 12 to ensure that the lock lever is correctly positioned into a closed orientation prior to raising the fifth wheel of an associated trailer so as to preclude unintentional separation or decoupling of the trailer from the fifth wheel hitch 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fifth wheel hitch warning interlock device comprising:

a fifth wheel hitch having a pivotally mounted lock lever for coupling a trailer to a towing vehicle;

a switch mounted relative to the fifth wheel hitch and including a follower responsive to a pivoting of the lock lever;

an indicator light responsive to an actuation of the switch for alerting an individual to a position of the lock lever;

an interlock means responsive to an operation of the switch for precluding operation of a trailer raise/lower lever when the lock lever is in an open orientation.

2. The fifth wheel hitch warning interlock device of claim 1, wherein the interlock means comprises an interlock solenoid mountable proximal to the trailer raise/lower lever, the interlock solenoid including a blocking projection which can be extended and retracted relative thereto so as to selectively block movement of the trailer raise/lower lever to preclude operation of the trailer raise/lower lever, the interlock solenoid being responsive to an operation of the switch so as to block operation of the trailer raise/lower lever when the lock lever is in the open orientation.

3. The fifth wheel hitch warning interlock device of claim 2, wherein the interlock solenoid comprises a pneumatic solenoid positionable in fluid communication with a pneumatic conduit supplying compressed air; and further comprising a pneumatic valve positioned in fluid communication with the pneumatic solenoid, the pneumatic valve being electrically controlled and responsive to an operation of the switch.

4. The fifth wheel hitch warning interlock device of claim 3, and further comprising a relay positioned in electrical communication with the switch and positionable in electrical communication with a power source, the indicator light and the pneumatic valve being electrically coupled to the relay so as to simultaneously operate in response to an operation of the switch.

5. The fifth wheel hitch warning interlock device of claim 4, wherein the switch is mounted to the fifth wheel hitch and the follower projects into a pivoting path of the lock lever.

6. The fifth wheel hitch warning interlock device of claim 1, and further comprising an air cylinder mounted to the fifth wheel hitch and including an actuator rod coupled to the lock lever so as to permit power assisted pivoting of the lock lever, wherein the switch is mounted to the air cylinder and the follower is responsive to a position of the actuator rod.

7. The fifth wheel hitch warning interlock device of claim 6, and further comprising a mounting sleeve secured to the air cylinder and concentrically positioned about the actuator rod, the actuator rod being shaped so as to define a depression directed thereinto which enters the mounting sleeve when the lock lever is positioned in a closed orientation, the switch being mounted to the mounting sleeve, with the follower of the switch engaging an exterior surface of the actuator rod and positioned so as to enter the depression when the lock lever is positioned in the closed orientation.

8. The fifth wheel hitch warning interlock device of claim 7, and further comprising an interlock means responsive to an operation of the switch for precluding operation of a trailer raise/lower lever when the lock lever is in an open orientation.

9. The fifth wheel hitch warning interlock device of claim 8, wherein the interlock means comprises an interlock solenoid mountable proximal to the trailer raise/lower lever, the interlock solenoid including a blocking projection which can be extended and retracted relative thereto so as to selectively block movement of the trailer raise/lower lever to preclude operation of the trailer raise/lower lever, the interlock solenoid being responsive to an operation of the switch so as to block operation of the trailer raise/lower lever when the lock lever is in the open orientation.

10. The fifth wheel hitch warning interlock device of claim 9, wherein the interlock solenoid comprises a pneumatic solenoid positionable in fluid communication with a pneumatic conduit supplying compressed air; and further comprising a pneumatic valve positioned in fluid communication with the pneumatic solenoid, the pneumatic valve being electrically controlled and responsive to an operation of the switch.

11. The fifth wheel hitch warning interlock device of claim 10, and further comprising a relay positioned in electrical communication with the switch and positionable in electrical communication with a power source, the indicator light and the pneumatic valve being electrically coupled to the relay so as to simultaneously operate in response to an operation of the switch.

\* \* \* \* \*